Dec. 23, 1930.    H. A. GARDNER    1,786,340
INSULATED CARRIER
Filed Feb. 1, 1930
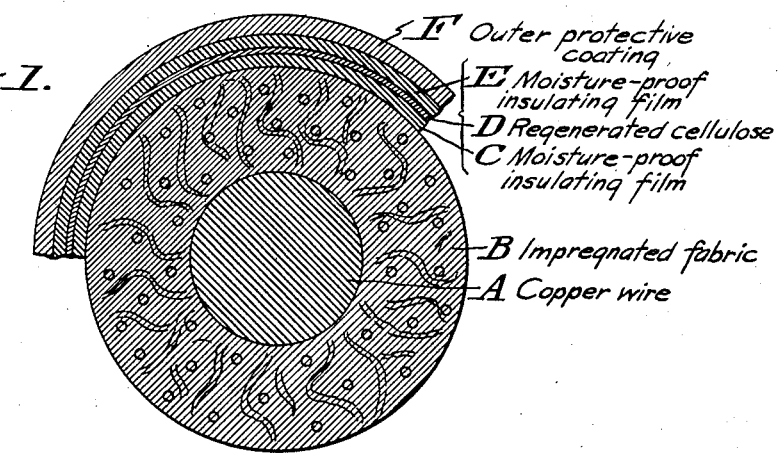
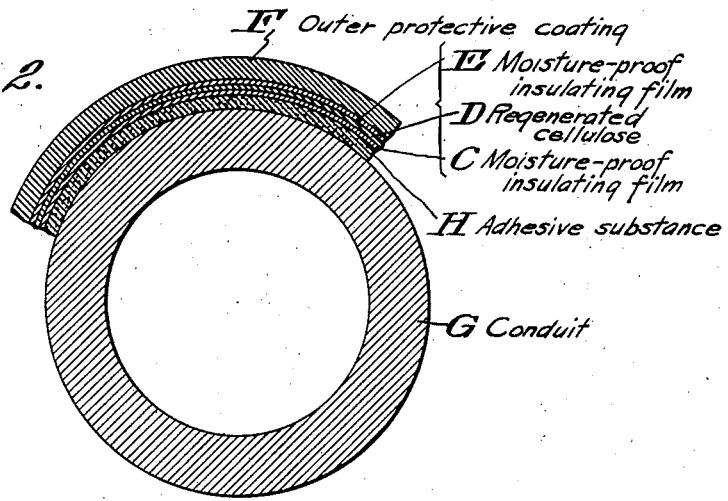
Inventor
Henry A. Gardner
By Byrnes, Townsend & Potter
his Attorneys Patented Dec. 23, 1930

1,786,340

UNITED STATES PATENT OFFICE

HENRY A. GARDNER, OF WASHINGTON, DISTRICT OF COLUMBIA

INSULATED CARRIER

Application filed February 1, 1930. Serial No. 425,335.

The present invention relates to a process of protecting metal carriers, and to metal carriers so protected. The invention is especially applicable for the protection of metal carriers of electricity, including copper wire and cable, and for the protection of pipe lines for the movement of oil, gas, and the like.

According to the present invention I apply to the surface of the object to be protected a composite sheet consisting essentially of a sheet of cellulosic material which has been coated on either side with a film of a material having high moisture-proofing properties and great resistance to the passage of electrical current. While I may use as the intermediate material sheets of such cellulosic materials as cellulose esters (nitrate or acetate) and cellulose ethers, the preferred form of cellulosic material is regenerated cellulose (sometimes known as "cellophane") produced from cellulose thio-xanthates which are commonly known as viscose. A sheet of this material is coated, preferably with a film consisting of equal parts by weight of cellulose acetate and an electrically resistive plasticizing resin such as, for example, a toluene sulfon amid aldehyde compound. As an illustration, the following formula has proved quite satisfactory as a coating material:

| | Grams |
|---|---|
| Cellulose acetate | 5 |
| Toluene sulfon amid-formaldehyde resin | 5 |
| Ethyl lactate | 25 |
| Acetone | 65 |

The coating is applied to the regenerated cellulose by spray, brush, knife blade, coating machine, or otherwise, and adheres thereto with great tenacity. The toluene sulfon amid-aldehyde resins are excellent plasticizers for cellulose esters, and hence serve a double function in composition such as the above.

To illustrate the remarkable value of a film of this character, I wish to state that tests have been made to determine the volume insulation resistance between two mercury electrodes by the usual high-sensitivity series galvanometer method. Readings were taken at 3 volts direct current after an electrification of one minute. From the readings obtained and the measured thickness of the specimen, the volume resistivity was calculated and is as follows:

Ordinary regenerated cellulose film having a thickness of 0.87 mils gave a volume resistivity in megohm-inches of 125.

The regenerated cellulose film coated on either side with the above-described moisture-proof electrically insulating composition, and having an average total thickness of 1.52 mils, gave a volume resistivity in megohm-inches of 1,500,000.

The process of using this remarkable composite sheet consists in applying it to the metal surface to which previously has been applied an adhesive in the form of a tacky varnish, or resin-rubber composition, or asphalt, or other materials which act as adhesives. The said film of coated regenerated cellulose is wrapped around the metal surface and adheres with great tenacity to the adhesive. It may then be further protected by subsequently applying a coat of filmforming material, such as varnish, enamel, lacquer, asphalt, or other product, which may be pigmented in colors if desired. Moreover, the cellulose acetate or other coating composition for the film itself may be colored and/or opacated with pigments if desired.

A formula illustrating the use of a mineral pigment in the coating composition for the regenerated cellulose sheet follows:

| | Grams |
|---|---|
| Cellulose acetate | 5 |
| Toluene sulfon amid-formaldehyde resin | 5 |
| Ethyl lactate | 25 |
| Acetone | 65 |
| Titanium oxide pigment | 5 |

In place of titanium oxide pigment there may be used an equivalent amount of iron oxide or other white or colored mineral pigment. The mineral pigment addition renders the resulting coating opaque.

At the present time, electric cables, such as copper cables, are usually covered with knitted fabrics. The fabric-covered cable is usually dipped into oil varnish or hot asphalt to become impregnated therewith and made moderately resistant to moisture. In my process, as the oil-, or asphalt-, impregnated cable emerges from the dipping tank, and while it still is warm, it is immediately wrapped with my special coated regenerated cellulose, the asphalt or oil varnish serving as the adhesive.

The invention will be further described by reference to the appended drawings which illustrate two embodiments of the invention. In the drawings:

Fig. 1 is a cross-sectional view of an insulated copper wire, showing a fragment of the protective coverings; and Fig. 2 is a cross-sectional view of a metal pipe or conduit, bearing a fragment of the protective covering.

In Fig. 1, A is a copper wire having about it a relatively thick layer B of loosely woven fabric impregnated with an asphaltic composition. Over this impregnated fabric there is laid a composite sheet C—D—E consisting of a sheet or film D of regenerated cellulose coated on either side with layers C and E of a moisture-proof electrically insulating composition consisting essentially of a cellulose ester or ether and toluene sulfon amid-formaldehyde resin C and E. F represents an optional outer protective coating of varnish or equivalent film-forming material.

In Fig. 2, G represents, in cross-section, an ordinary conduit or pipe of iron or steel, on the exposed outer surface of which lies a layer H of adhesive such as tacky varnish or the like.

It is to be understood that—as has been indicated in the foregoing—the invention is not limited to the use of any specific cellulosic material or of any specific agent for bonding the resin-coated cellulosic material to the metal surface. It is to be understood also that an outer protective coating (i. e., "F" in the figures) is not essential, although it may be desirable. Also, in place of toluene sulfon amid-aldehyde condensation products I may use the equivalent condensation products of the benzene sulfon amid-aldehyde, and xylene sulfon amid-aldehyde, types, and in the foregoing description and appended claims the term "toluene sulfon amid-aldehyde resins" is intended to include the benzene sulfon amid-aldehyde resins and the xylene sulfon amid-aldehyde resins.

I claim:

1. As a new product, a moisture-proof electrically resistive wrapping comprising a sheet of cellulosic material carrying on each side thereof an adhering layer of a composition consisting essentially of a cellulose ester and a plasticizing resin.

2. As a new product a composite sheet comprising a sheet of regenerated cellulose carrying on each side thereof an adhering layer of a composition consisting essentially of cellulose acetate and a plasticizing resin of the toluene sulfon amid-aldehyde series.

3. A metal object a surface of which is covered with a moisture-proof electrically resistive composite sheet consisting of a sheet of regenerated cellulose carrying on each side thereof an adhering layer of a composition consisting essentially of a cellulose ester and a plasticizing resin.

4. A metal object a surface of which is covered with a moisture-proof electrically resistive composite sheet consisting of a sheet of regenerated cellulose carrying on each side thereof an adhering layer of a composition consisting essentially of cellulose acetate and a plasticizing resin of the toluene sulfon amid-aldehyde series.

In testimony whereof, I affix my signature.

HENRY A. GARDNER.